Patented Apr. 1, 1930

1,752,374

UNITED STATES PATENT OFFICE

ROBERT DURRER, OF BERLIN-WANNSEE; FRIEDRICH CARL SIEMENS, OF BERLIN-DAHLEM; AND ARTHUR SPRENGER, OF BERLIN-CHARLOTTENBURG, GERMANY, ASSIGNORS TO FRIEDRICH SIEMENS AKTIENGESELLSCHAFT, OF BERLIN, GERMANY, A CORPORATION OF GERMANY

PROCESS OF PRODUCING STEEL IN AN OPEN-HEARTH FURNACE

Application filed January 28, 1927, Serial No. 164,257, and in Germany September 26, 1925.

Our invention relates to a process of producing steel in an open hearth furnace.

Our invention refers to the production of steel in the open hearth furnace and has for its object the protection of the charge at certain periods from oxidizing agents which may be introduced into or generated in the furnace, such protective action commencing not latter than the time of completion of the refining period.

In the production of steel in the open hearth furnace five distinct phases or stages may be distinguished: the melting, the refining (i. e. the elimination of impurities by oxidation), the reduction, the settling (i. e. the separation of constituents according to their specific weight) and the alloying. During the first two of these five phases the oxidizing action of the flame does no harm. During the last three phases it has a detrimental action, because new oxygen compounds pass then again and again into the steel by way of the slags. Since in the last three stages particularly high temperatures are required, the oxidizing action of the flame is the more intense. In other steel processes, for instance in the crucible process and in the electro-steel process, in which the oxidizing action of the flame does not exist, the reduction and the settling periods may be extended for any length of time and the alloying may be carried out at leisure without the expensive alloying materials being wasted by oxidation under the action of the flame. This possibility did not exist in the open hearth process up to now. According to our invention in its attained by eliminating the action of the oxidizing constituents at least from the completion of the refining stage forward.

Our improved process may, for instance, be carried through in such a manner that a special protective layer is interposed between the heating flame and the charge and which in its composition is quite independent of the heating flame and which is so constituted that by means of it the required chemical action may be obtained. As the heating flame will generally have an oxidizing action, the said protective layer will generally be so constituted that it acts reducing or is inert. The protective layers should be spread like a veil over the entire charge i. e. be as thin as possible. This is advisable for two reasons, firstly because the layer should protect the entire surface of the bath against the heating flame, and secondly because a layer of excessive thickness might possibly contain carbonic acid gas and for this reason exert an absorbing action upon the heat radiation and thus impair the action of the heating flame upon the bath.

Our improved process may be carried out in various ways, it being essential only that a protective layer is formed between the heating flame and the charge. It is, however, desirable that the composition of this layer should be capable of variation in accordance with the requirements. The manner of forming the heating flame or the design for the burner of this heating flame is immaterial, as the broad idea of our invention is applicable to any open hearth burner construction, so long as it does not break up and destroy the protective layer located underneath it.

The drawings affixed hereto illustrate a number of embodiments of our invention by way of example.

These drawings illustrate in

Fig. 1, a vertical longitudinal section through the front part of an open hearth furnace according to our invention, Fig. 2, a horizontal longitudinal section of the same, Fig. 3, a modified construction in vertical section, Fig. 4, a horizontal section of the same, Figs. 5 and 6, vertical and horizontal sections respectively of a further modification, Figs. 7 and 8, vertical and horizontal sections respectively of a still further modification, Figs. 9 and 10, vertical and horizontal sections respectively of a further modification, Figs. 11 and 12, a vertical longitudinal section and a transverse section respectively of another modification, Figs. 13 and 14, a vertical longitudinal and a horizontal section respectively through yet another modification, Fig. 15, a longitudinal vertical section through a complete furnace, Fig. 16, a horizontal section through Fig. 15, and in

Figure 1:
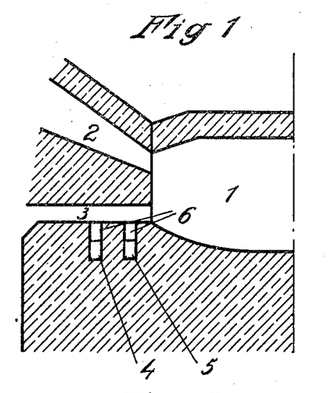
Figure 2:
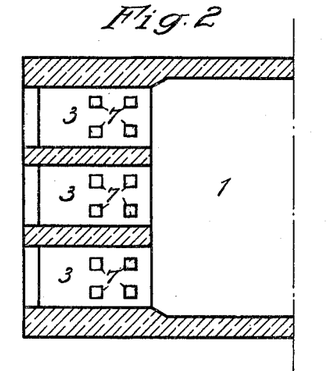

Referring to Figs. 1 and 2, 1 is the melting chamber, 2 the air supply channel and 3 the gas supply channel, which subdivided into three compartments extends practically across the entire width of the hearth. From below ducts 4 and 5 lead into these gas channels which open into holes 7 in the bottom of the channels. These ducts introduce those gases which are necessary in order to convert the reducing gas flowing onto the hearth into oxidizing or neutral or inert gases. For this purpose a certain quantity of air, for instance, may be introduced through the duct 5 or through the ducts 5 and 4. It is, however, also possible to add through the ducts 4 or 5 combustion gases to the gas channel, or through one duct air and through the other duct tar, because it has been ascertained that the tar flame has a particular action upon the bath. When changing over the ducts 4 and 5 may simultaneously be changed over. If very small quantities only come into consideration the changing over may be omitted and the gases may at the discharge end be allowed to escape into the regenerative chambers.

Figure 3:
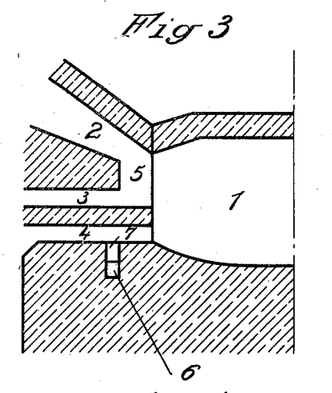
Figure 4:
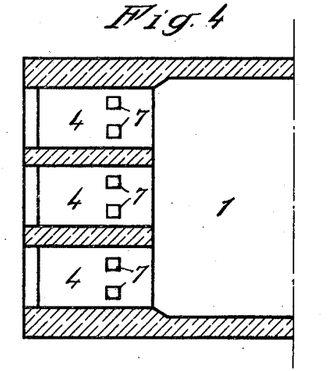

Referring to Figs. 3 and 4, the gas flue is subdivided into two compartments 3 and 4. While the compartment 3 serves for the heating flame only and a mixing burner is indicated by the preliminary combustion chamber 5, the gas flue 4 serves only the purpose of producing the protective layer in conjunction with the channel 6 and the openings 7 which are again adapted to supply the gases mentioned.

Figure 5:
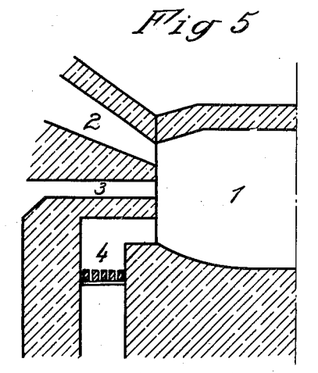
Figure 6:
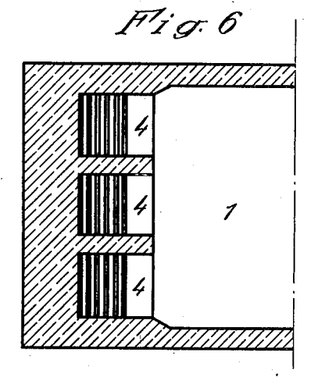

Referring to Figs. 5 and 6 of the drawings, it will be seen that the protective layer is produced by a direct furnace 4, the gases from which are passed in three divisions into the melting chamber in such a manner that the gases are interposed between the heating flame and the bath. By regulating the primary air supply of the furnace 4 an oxidizing, reducing or inert protective layer may be generated between heating flame and bath.

Figure 7:
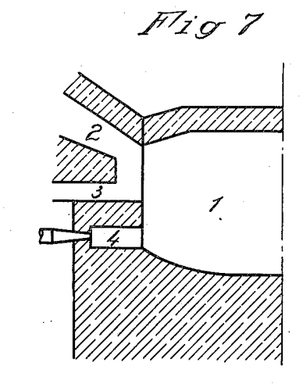
Figure 8:
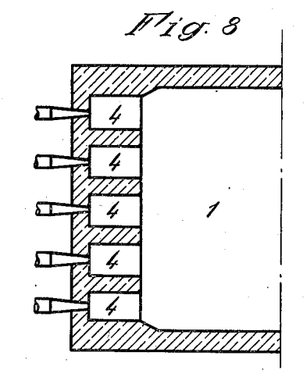

Referring to Figs. 7 and 8 of the drawings, it will be seen that a mixing burner for hot gases and hot air passing through the ducts 2 and 3 is provided in this design of the furnace, while the protective layer is produced by five burners 4 again located directly above the bath and extending practically across the entire width of the hearth. Nozzles of any suitable construction lead into these burners 4 into which those materials or media required for the generation of the oxidizing, reducing, inert, or tar containing protective layer are mixed and injected in regulable volumes.

Our process of forming a protective layer may be carried out in a particular favorable manner if the medium employed for the protection is conducted onto the surface of the bath by nozzles. These protective nozzles are preferably not taken into service at once, because in the first part of the operation the oxidizing action of the heating flame has not such a highly detrimental effect as after the melting down of the charge. In case the protective nozzle is supplied with gas it is advisable to employ an additional tar charge to finish up.

Figure 9:
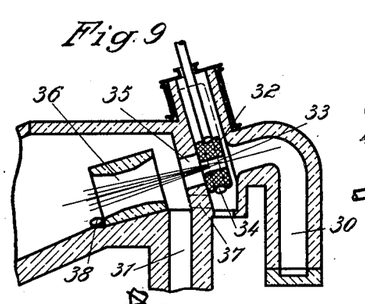
Figures 10, 11, 12, 14:
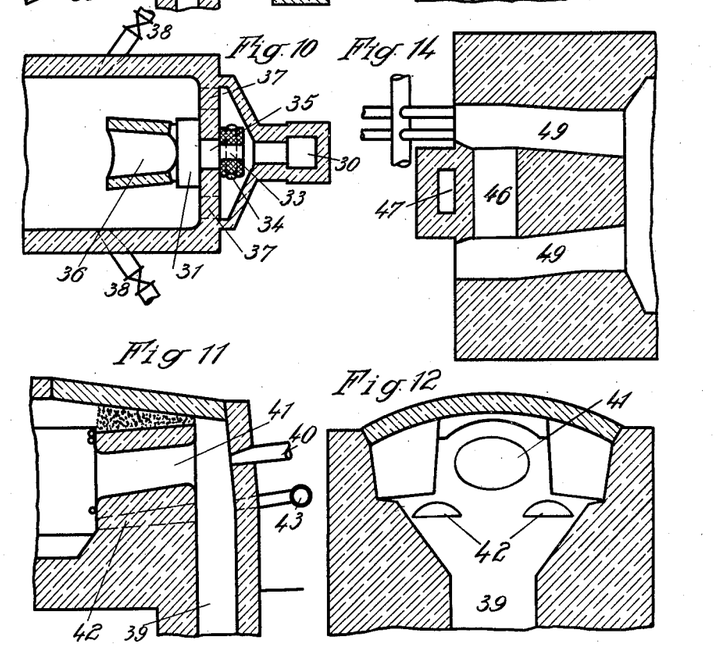

Referring to the Figs. 9 and 10, 30 is the gas supply channel and 31 the air supply channel. The burner nozzle 32 with the opening 33 and the bandage 34 holding it in position are located in front of the inlet opening 35 into the interior of the furnace.

In the preliminary combustion chamber the mixing nozzle 36 is arranged separately from the brickwork, so that at the outlet end of the furnace the waste gases may also pass around the nozzle towards the chambers. 37 are the channels according to our invention provided below the mixing nozzle through which the protective gas, in the present case for instance the same as the fuel gas, is introduced into the interior of the furnace in such a manner that it spreads as far as possible over the entire surface of the bath and forms a protective layer between the heating flame and the bath. The closing devices by means of which the channels 37 are sealed during the time immediately after the introduction of the charge are not illustrated in these figures. Instead of or in addition to the channels 37 lateral nozzles 38 may be provided which are directed towards points located below the flame issuing from the mixing nozzle and which may be supplied with tar vapors or with any other suitable protective gas under sufficient pressure.

If cold air or cold tar vapors would reach the surface of the bath through the protective nozzle the temperature of the bath would of necessity be lowered. The furnace is therefore preferably so designed that a part of the hot air is drawn from the air uptake into the protective nozzle (protective channel). A partial combustion and thus a dilution of the protective gases is caused thereby, but this is more than balanced by the advantage of the preheating attained. Although under certain conditions a single protective burner would be sufficient, the channels introducing the protective gases are preferably arranged at both sides below the mixing nozzle, in order to cut off the part of the current of air which might not have been carried along by the mixing nozzle but might sweep past it sideways. The action of the mixing nozzle is still further improved in this way without any fear that the bath might become more strongly oxidized.

Such a design of the furnace is illustrated in Figs. 11 and 12 by way of example.

Referring to these figures 39 is the air supply duct, 40 the nozzle through which the fuel gas is introduced into the furnace, 41 the mixing nozzle, 42 the channels for introducing the protective medium by way of the nozzle 43 into the interior of the furnace and onto the surface of the bath. On its way from the nozzle 43 into the protective channel 42 the protective gas carries along part of the hot air ascending in the air channel 39 and reaches the interior of the furnace in a preheated state.

Figure 13:
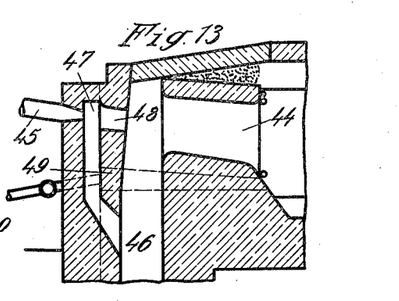

In case the mixing nozzle is fed with high grade cold gases, it is advisable to carry out the mixing with hot air repeatedly. This may, for instance be effected in the manner illustrated in Figs. 13 and 14. In these figures 44 is the mixing nozzle, and 45 the nozzle through which the fuel gas reaches the furnace. It opens into an auxiliary channel 47 branching off the air channel 40 below the mixing nozzle 44. This auxiliary channel is again in communication with the main air channel 46 by a nozzle-like channel 48 opposite the mixing nozzle. In this way the result is attained that the current of gas is mixed with hot air first when traversing the auxiliary air channel and a second time when it traverses the main air channel 46. In this way a better mixture of the cold gas with the hot air is obtained and in consequence thereof also a better action of the mixing nozzle 44. The protective gases are conducted through the channels 49, provided at both sides of the mixing nozzle and below it, into the interior of the furnace and onto the surface of the bath.

The design as just described may with advantage be applied to such furnaces also in which the mixing nozzle is not arranged independent within the preliminary combustion chamber.

In operating large regenerative furnaces, more particularly of the Siemens-Martin type, it has been recognized that a great furnace capacity and a more economical operation can be obtained only when the flame remains in intimate contact with the bath along the entire length of the furnace and does not follow the natural buoyancy which has the tendency to drive the flame towards the highest point of the furnace, that means away from the bath. It has been attempted to solve this problem by allowing the gas to enter the melting chamber in the form of a dense jet in the direction towards the bath and at a high speed, so that due to its inertia it travels closely to the surface of the bath to the end of the heating or melting chamber. This solution of the problem has the disadvantage that the jet or stream of gas is not burned completely, since it is impossible to obtain a sufficiently intimate mixture with the air. Experiments in this direction have not yet produced satisfactory results, the less so as by an increase of the speed of the gas the necessary good mixture is reduced at the same rate.

When employing an integral current of gas another unfavorable feature is noticed. The solid current does not sweep across the bath in its entire width, inasmuch as it forms a kind of jet, but only along the central portion of the bath, which is then heated by friction as well as by radiation while the remaining parts of the bath consume radiated heat only.

In comparatively small furnaces this unfavorable action of the solid current of gas may be ameliorated by dividing the current i. e. by allowing the gas to enter through a plurality of channels or nozzles distributed across the width of the furnace. In large furnaces this division cannot very well be carried out since owing to the great length of the hearth the flame spreads and cannot be kept down upon the surface of the bath. The surface of the gas current is very large in comparison with its mass and the friction therefore so great that the inertia of the gas is not sufficient to hold the flame down upon the bath along the entire length of the hearth even if the initial entering speed of the gas is made as high as possible. If the broad and flat stream of gas were kept down upon the bath by lowering the arch of the furnace so that the flame has no opportunity to deviate upwards, the advantage of the free development of the flame would be abandoned, not taking into consideration the fact, that in modern Siemens-Martin furnaces it is impossible to work with a furnace arch lowered along the entire length of the bath because the charging moulds of the charging machine require a considerable space between bath and arch.

The problem of obtaining a broad flame which extends over the entire length of the bath and remains in close contact with it is according to our invention solved by introducing the gas in the form of a broad flat layer and deflecting it at least at one point over the hearth in the direction towards the bath, that means the flame tending to detach itself from the bath is compelled to turn in the direction towards the bath.

For deflecting the flame towards the bath special guide walls may, for instance, be provided which project from the arch of the furnace.

It is, however, also possible to obtain a broad current of gas closely adhering to the bath over the entire length of the hearth by drawing the arch above the bath in places so far down that the flame is forced onto the bath. In this manner certain boom arches are formed in the furnace arch which represent the drawn down places in the arch of the melting chamber. Generally it will be sufficient to provide two of these boom arches, one fairly close to the inlet of the flame into the furnace and the other at a corresponding distance from the end of the hearth which latter then serves to force the broad flame down onto the bath again before it leaves the furnace. The essential feature of this arrangement resides in the fact that the boom arches are located over the hearth or over the bath and not, as heretofore usual, as connection of the burner head with the arch of the hearth, in which case they were usually located above the firebridge.

Figure 15:
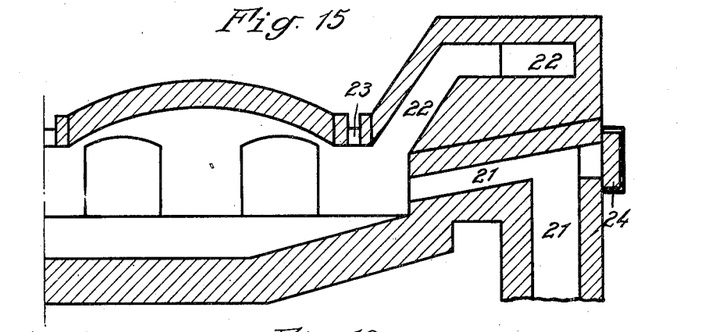
Figure 16:
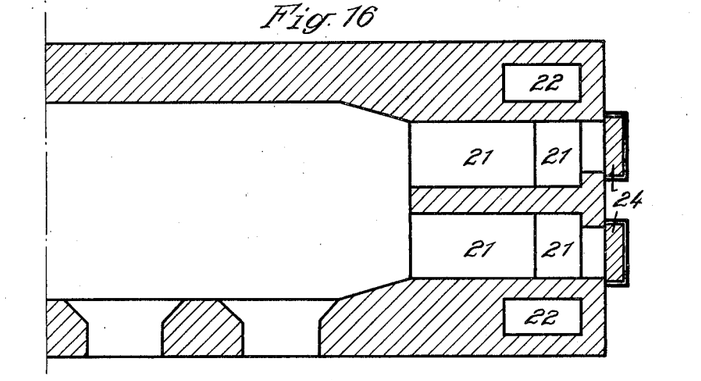
Figure 17:
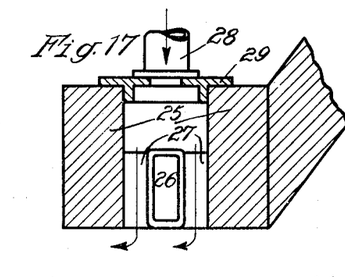
Fig. 17, a detail.

A furnace of this kind is shown in various sections in the Figures 15 to 17. Gas and air are introduced separately through the channels 21 and 22 which are directed towards the bath so that the flame burns at first in the direction towards the bath. 23 are the drawn down boom arches of the furnace, one half of which is shown only. At these places the current of gas receives a component directed downwards, that means the flame gradually detaching itself is again forced down onto the bath. The number of the transverse boom arches depends upon the length of the furnace.

The gas issuing from the flat channel is subjected to strong friction, as already mentioned, and is therefore easily deflected from its original direction by mechanical obstacles. Such mechanical obstacles are easily produced by the accumulation of foam or squirts of slag upon the bottom of the gas channel, particularly at its end facing the heating channel. These obstacles may become substantial enough to deflect the current of gas from the charge. To permit the removal of the disturbances of the operation of the furnace resulting therefrom, the gas channels are made easily accessible from outside. The gas channels are therefore extended towards the rear and traverse the brickwork of the furnace, the mouth being closed by doors 24, which can easily be opened and through which the obstacles in the channel can be removed. Owing to the great heat to which the lowered arch portions are exposed the wear of these parts may become so considerable that repairs must be made at frequent intervals. In such cases the furnace is only of practical value from the economical viewpoint, if the boom arches, particularly at their lowest portions, are according to the invention protected against rapid destruction by a suitable cooling arrangement. As cooling agent air or water or a combined air and water cooling device may be employed.

Fig. 17 of the drawings illustrates such a combined cooling apparatus in cross-section.

Referring to this figure it will seen that between the bricks 25 is located a flat tube 26 which is traversed by water and abstracts heat from the brickwork, so that the same is protected against fusing. The tube 26 is held in position by spaced distance bricks 27 between which openings remain. Through the pipe 28 attached to a sealing plate 29 cold air enters and cools the brickwork 25 and the tube 26. After sweeping past the parts to be cooled it enters the heating chamber in which it acts as cooling medium for the furnace arch.

It is well known that the quality of the steel produced in open hearth furnaces depends to a great extent from the condition of the gases with which the liquid steel is brought in contact during its manufacture. It is common knowledge that steam and oxygen have a detrimental action upon the steel. Hydrogen was generally considered harmless, the more so because it has a reducing action and because it is known that by a reduction by means of hydrogen iron may be obtained which possesses excellent properties. It has, however, been ascertained that at temperatures of about 1000° and more, as developed in the open hearth or Siemens-Martin furnace, the hydrogen has a very detrimental action upon the qualities of the steel. Probably chemical compounds or changes of another kind not easily determined are produced at these high temperatures which impair the strength of the steel in a high degree. According to our invention the process of manufacturing steel in the open hearth furnace may be carried through in such a manner that the steel is only brought in contact with gases which are practically free from hydrogen. Not only hydrogen but also steam and hydrocarbons, which are as a rule contained in producer gas and in other customary fuel gases are carefully kept away from the steel.

The process may be carried out in a particular suitable maner by employing a pulverized coal furnace, in which a fuel poor in gaseous constituents, such as coke, semi-coke or lean coal is used.

For heating the furnace, gases practically free from hydrogen, such as for example blast furnace gases, may also be used. Since these gases by themselves do not produce a sufficiently high temperature, they are employed in conjunction with an additional furnace, for instance a pulverized coal furnace. The pulverized coal is blown into the blast furnace gas current either by air, but preferably by blast furnace gas. A tapping producer may also be employed which works without steam, if in it coal, coke or semi-coke preferably as free as possible from gas is used.

The process may be carried out in such a manner that the fuel gas entirely or substantially free from hydrogen is passed along the bath in such a manner that it sweeps over the bath in its entire width and that it does not mix completely with the combustion air above it. In this way the result is obtained that the combustion air is kept away from the bath altogether during the melting and finishing. The current of gas is blown into the furnace in a broad flat layer which sweeps over the entire surface of the bath. Special care must be taken that no whirls or eddys are produced at the sides of the gas current, by which the combustion air carried along may be brought in contact with the surface of the bath. It has now been ascertained that the action of this treatment of the bath free from hydrogen and oxygen may be still further increased by admixing pulverized coal with the fuel gas. The quality of the steel obtained in this way is considerably improved and it is even possible to work with less pure fuel gas. A low content of hydrogen is far less harmful in the presence of finely distributed carbon. This may probably be accounted for by the fact that carbon has a far greater reducing action at the high temperatures than hydrogen and that it prevents to a certain extent the development of the detrimental changes which are otherwise brought about by hydrogen.

Our process may, furthermore, be carried out in such a way that besides the gas and the combustion air pulverized coal is introduced into the hearth chamber and in such a manner that it is blown into the furnace by special nozzles opening directly into the hearth chamber. The pulverized coal may hereby be injected in such a manner that it mixes in the furnace chamber with the gases entering through the gas duct. It may, however, also be injected in such a manner that it is located underneath the current of gas and forms a protective pulverized coal atmosphere between the current of gas and the bath. The pulverized coal may also be injected in such a manner that it fills the corners of the hearth chamber which are not fully swept by the current of gas. This prevents combustion air from accumulating in these corners which might have an oxidizing action upon the bath.

One or the other of these effects is attained by the particular arrangement of the pulverized coal nozzles. These nozzles are either provided in the sides of the gas duct or below the duct and a direction may be given to them which is more or less parallel or inclined to the longitudinal axis of the furnace, according to requirement.

The action of the injected pulverized coal may be further improved by using coal dust of different sizes, viz, finely ground coal dust which remains suspended in the current of gas for a considerable time and coarser pulverized coal which descends more or less quickly onto the bath. The two kinds of pulverized coal may either be injected mixed with each other through the same nozzle or by special separate nozzles. The finely reduced coal serves then principally for increasing the reducing action of the flame and the temperature, while the larger sized coal drops for the larger part onto the bath and exerts a reducing action upon its surface.

The manner in which the coarser pulverized coal is introduced is immaterial, so long as the introduction is effected uniformly and regularly. The introduction could, for instance, be effected by any suitable projecting apparatus or even by hand, provided that correct distribution and uniform supply is ensured.

It has also already been suggested to throw coal upon the bath for the purpose of reducing the slag. Pieces of carbon electrodes have, for instance, been thrown into the slag or small coke has been shoveled onto the slag. In contrast therewith the coal crushed into small pieces is according to our invention continuously and uniformly introduced, preferably so that it distributes itself over the entire surface of the bath and descends upon it. In this way a much more reliable and uniform action is attained and a strongly reducing effect is exerted upon the slag. It has been ascertained that by the addition of somewhat larger size pulverized coal to the fine dust the strength as well as the toughness of the steel is increased and that in particular those properties are improved which result from the notch impact test.

The proportions of finely ground dust to the coarser pulverized coal may be varied within wide limits. It is also possible to employ pulverized coal which consists from the very beginning of medium sized granules and the particles of which remain partly suspended and partly drop down onto the bath. The most favorable condition of the pulverized carbon for each individual furnace and for each arrangement of the nozzles is best ascertained by practical tests.

A particularly high grade steel of great strength may, furthermore, be produced if after the reduction the charge is allowed to settle until an extensive separation of impurities, that means separation of parts according to their specific weight, has taken place. In other processes of operating open hearth furnaces this is not possible. It is possible to allow the charge to stand for a considerable time and to bring about an extensive separation of impurities, but it is then regularly found that the steel has not only not been improved, but that its quality has sometimes become even worse. As a rule it is necessary to recarburize the steel after the charge has been kept standing for some time which then renders a further refining necessary. If on the other hand pulverized coal or pulverized coal and larger size coal is introduced continuously and uniformly during the settling period a steel is obtained immediately after the tapping which, if desired after an addition of alloying agents, such as ferro-silicon, possesses excellent qualities as regards strength and in particular notching toughness and elasticity. By our process the same good results may be attained in the open hearth furnace, even with the basic process, as otherwise only obtainable in the electro-furnace or the crucible furnace.

It has already been mentioned that a particularly good quality of steel is obtained if a protective atmosphere of pulverized coal is formed between the current of gas and the bath. According to our invention the introduction of the pulverized coal only commences after the completion of the refining period. During the refining period the formation of a protective veil is avoided. It is, on the other hand possible to introduce pulverized coal during the refining period also, provided the coal is mixed with air so that the oxidizing action upon the bath is not neutralized. This introduction of pulverized coal mixed with air during the refining period has the advantage that a particularly hot flame is produced and more favorable conditions are obtained for the subsequent purification, more particularly for the removal of sulphur and phosphorus. This applies more particularly to the basic process.

Various modifications and changes may be made without departing from the spirit and the scope of the invention, and we desire, therefore, that only such limitations shall be placed thereon as are imposed by the prior art.

We claim as our invention:

1. In a process of producing steel in an open hearth furnace, the method of protecting during a part of the process the melt against oxidation, consisting in forming a protective layer between the heating flame and the melt, said layer being composed of material which does not produce oxidization products deleterious to the melt and which is different from the fuel used.

2. In a process of producing steel in an open hearth furnace, the method of protecting during a part of the process the melt against oxidation, consisting in forming a shallow protective layer between the heating flame and the melt, said layer extending across the whole width of the hearth and being composed of material which does not produce oxidation products deleterious to the melt and which is different from the fuel used.

3. In a process of producing steel in an open hearth furnace, the method of protecting during a part of the process the melt against oxidation, consisting in forming a protective layer between the heating flame and the melt, said layer being composed of material which does not produce oxidation products deleterious to the melt and which is different from the fuel used, the quantity and composition of said material being regulable, to permit the adaption of any desired chemical reaction of said layer to the requirements of the particular steel under treatment.

4. In a process of producing steel in an open hearth furnace, the method of protecting during a part of the process the melt against oxidation, consisting in forming a protective layer between the heating flame and the melt, said layer containing a gas which does not produce oxidation products deleterious to the melt and which is different from the fuel used, said layer being deflected at least at one point in the hearth towards the melt.

5. In a process of producing steel in an open hearth furnace, the method of protecting during a part of the process the melt against oxidation, consisting in forming a protective layer between the heating flame and the melt, said layer containing a gas practically free from hydrogen to prevent formation of oxidation products deleterious to the melt and being different from the fuel used.

6. In a process of producing steel in an open hearth furnace, the method of protecting during a part of the process the melt against oxidation, consisting in forming a protective layer between the heating flame and the melt, said layer being composed of material which does not produce oxidation products deleterious to the melt, and in guiding fuel gas only partly mixed with air over the entire width of the melt, said material being different from the fuel used.

7. In a process of producing steel in an open hearth furnace, the method of protecting during a part of the process the melt against oxidation, consisting in forming a protective layer between the heating flame and the melt, said layer being composed of fuel gas, only partly mixed with combustion air, and containing an admixture of pulverized carbonaceous material and sweeping over the melt across its entire width.

8. In a process of producing steel in an open hearth furnace, the method of protecting during a part of the process the melt against oxidation, consisting in forming a protective layer between the heating flame and and the melt, said layer being composed of fuel gas only partly mixed with combustion air and sweeping the entire width of the melt, and of a layer of pulverized coal injected below the fuel gas layer, so that a protective pulverized coal atmosphere is formed between the gas layer and the melt.

9. In a process of producing steel in an open hearth furnace, the method of protecting during a part of the process the melt against oxidation, consisting in forming a protective layer between the heating flame and the melt, said layer being composed of fuel gas only partly mixed with combustion air and sweeping the entire width of the melt, and of a layer of fine and coarse pulverized coal injected below the fuel gas layer, so that a protective pulverized coal atmosphere is formed between the gas layer and the melt.

10. In a process of producing steel in an open hearth furnace, the method of protecting during a part of the process the melt against oxidation, consisting in forming a protective layer between the heating flame and the melt, said layer being composed of fuel gas only partly mixed with combustion air and sweeping the entire width of the melt, and of a layer of pulverized coal injected below the fuel gas layer, so that a protective pulverized coal atmosphere is formed between the gas layer and the melt, and continuing the injection of pulverize coal until the impurities contained in the melt settle according to their specific weight.

11. In a process of producing steel in an open hearth funace, the method of protecting during a part of the process the melt against oxidation, consisting in forming a protective layer between the heating flame and the melt, said layer being composed of fuel gas only partly mixed with combustion air and sweeping the entire width of the melt, and of a layer of pulverized coal injected below the fuel gas layer, so that a protective pulverized coal atmosphere is formed between the gas layer and the melt, and continuing the injection of pulverized coal until the impurities contained in the melt settle according to their specific weight, and injecting pulverized coal mixed with air during the refining period and injecting pulverized coal along subsequent to the refining period.

In testimony whereof we affix our signatures.

ROBERT DURRER.
FRIEDRICH CARL SIEMENS.
ARTHUR SPRENGER.